(12) United States Patent
Ishigami et al.

(10) Patent No.: US 8,949,004 B2
(45) Date of Patent: Feb. 3, 2015

(54) CONTROL SYSTEM FOR INTERNAL COMBUSTION ENGINE

(75) Inventors: Yoshiharu Ishigami, Wako (JP); Hajime Uto, Wako (JP); Jun Kato, Wako (JP); Naoki Inoue, Wako (JP); Kenji Tsukahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 273 days.

(21) Appl. No.: 13/642,113

(22) PCT Filed: Feb. 9, 2011

(86) PCT No.: PCT/JP2011/052726
§ 371 (c)(1),
(2), (4) Date: Oct. 18, 2012

(87) PCT Pub. No.: WO2011/161980
PCT Pub. Date: Dec. 29, 2011

(65) Prior Publication Data
US 2013/0090839 A1    Apr. 11, 2013

(30) Foreign Application Priority Data

Jun. 22, 2010 (JP) .................................. 2010-141452

(51) Int. Cl.
*F02M 25/07* (2006.01)
*F02D 41/00* (2006.01)

(52) U.S. Cl.
CPC ........ *F02D 41/0002* (2013.01); *F02D 41/0005* (2013.01); *F02D 41/0055* (2013.01);

(Continued)

(58) Field of Classification Search
CPC ............ F02D 41/0002; F02D 41/0005; F02D 41/0007; F02D 41/0017
USPC ........ 701/108, 101, 102; 123/568.11, 568.21, 123/559.1, 564
See application file for complete search history.

(56) References Cited

U.S. PATENT DOCUMENTS

2009/0308071 A1* 12/2009 Yamashita et al. .............. 60/602
2010/0300088 A1* 12/2010 Joergl et al. ..................... 60/602

FOREIGN PATENT DOCUMENTS

| JP | 8-277752 A | 10/1996 |
|----|-----------|---------|
| JP | 9-209798 A | 8/1997 |

(Continued)

*Primary Examiner* — Mahmoud Gimie
(74) *Attorney, Agent, or Firm* — Squire Patton Boggs (US) LLP (57) ABSTRACT

A control system for an internal combustion engine where when the engine is decelerating the amount of intake air supplied to a combustion chamber is controlled. A target auxiliary intake air amount SAIRCMD necessary for preventing misfiring of the engine by supplying only an auxiliary intake air amount to a combustion chamber and a target intake air amount GAIRCMD which is a target value of the amount of intake air supplied to the combustion chamber are calculated according to the state NE, AP of the engine. When the engine is decelerating, and misfires, misfire avoidance control is executed controlling an auxiliary intake air amount control valve to be more opened such that the auxiliary intake air amount becomes the target auxiliary intake air amount SAIRCMD and a throttle valve to be more closed such that the amount of intake air supplied to the combustion chamber becomes the target intake air amount GAIRCMD.

16 Claims, 5 Drawing Sheets

(52) U.S. Cl.
F02D 41/0007 (2013.01); F02M 25/0709 (2013.01); Y02T 10/42 (2013.01); Y02T 10/47 (2013.01); F02D 2041/0017 (2013.01); F02D 2200/101 (2013.01); F02D 2200/1015 (2013.01); F02D 2200/602 (2013.01)

USPC ..................................... 701/108; 123/568.21

(56) References Cited

FOREIGN PATENT DOCUMENTS

| | | |
|---|---|---|
| JP | 11-107825 A | 4/1999 |
| JP | 3760591 B1 | 3/2006 |
| JP | 2007-127037 A | 5/2007 |

* cited by examiner

CONTROL SYSTEM FOR INTERNAL COMBUSTION ENGINE

CROSS-REFERENCED TO RELATED APPLICATION

This application is a National Phase entry of International Application PCT/JP2011/052726, filed Feb. 9, 2011, which claims priority to Japanese Patent Application No. 141452/2010, filed Jun. 22, 2010, the disclosure of the prior application(s) are hereby incorporated in their entirety by reference.

TECHNICAL FIELD

The present invention relates to a control system for an internal combustion engine equipped with an external EGR device that recirculates part of exhaust gases to an intake passage.

BACKGROUND ART

Conventionally, as an external EGR device of this type, for example, one disclosed in PTL 1 has been known. This external EGR device is a so-called low pressure type, with an EGR passage and an EGR control valve, and is provided in an internal combustion engine together with a turbo-type supercharger. This EGR passage is connected to a downstream side of a turbine of the supercharger in an exhaust passage and to a downstream side of a throttle valve and an upstream side of a compressor of the supercharger in an intake passage, such that part of exhaust gases is recirculated to the intake passage as EGR gas via the EGR passage. Further, the amount of EGR gas recirculated to the intake passage is controlled by the EGR control valve.

Further, to the intake passage of the internal combustion engine disclosed in PTL 2, a bypass passage is connected to bypass the throttle valve. In this bypass passage, an auxiliary intake air amount control valve is provided for controlling the amount of fresh air supplied via the bypass passage to a combustion chamber of the engine. Further, in PTL 2, when the engine is in a decelerating operation state and executes a combusting operation without fuel cut, the control system controls the throttle valve to a fully-closed state and the opening degree of the auxiliary intake air amount control valve to a predetermined opening degree according to a predetermined target auxiliary air amount. The target auxiliary air amount is set to such a value as can avoid misfiring of the engine caused by shortage of the amount of fresh air due to the control of the throttle valve to the fully-closed state.

CITATION LIST

Patent Literature

[PTL 1] Japanese Laid-open Patent Publication No. 2007-127037
[PTL 2] Japanese Patent Publication No. 3760591

SUMMARY OF INVENTION

Technical Problem

However, when the external EGR device of the low pressure type disclosed in PTL 1 is applied to the engine disclosed in PTL 2, there arise the following problems: In general, although the EGR gas is effective for reduction of the amount of NOx which is generated by the combustion of the engine, it can be a factor causing instability of the combustion of the engine. Further, in the external EGR device, the EGR gas is recirculated via the EGR passage to the intake passage and is then supplied to the combustion chamber, and hence the amount of EGR gas actually supplied to the combustion chamber changes with a time lag from the control of the EGR control valve. Therefore, even if the EGR control valve is controlled to reduce the amount of EGR gas according to the decelerating operation of the engine, the amount of EGR gas actually supplied to the combustion chamber is reduced not promptly but with some time lag. On the other hand, in PTL 2, when the engine is in a decelerating operation state with engine combustion being executed, the opening degree of the auxiliary intake air amount control valve is only controlled according to the above-mentioned target auxiliary air amount. Therefore, the above-mentioned delayed reduction of the EGR gas can have an effect of causing a misfire of the engine.

Further, in the above-described low pressure-type external EGR device, the EGR passage is connected to the upstream side of the compressor in the intake passage, as described above. Therefore, in the low pressure-type external EGR device, compared with a so-called high pressure-type external EGR device, i.e. an external EGR device having an EGR passage connected to a downstream side of the compressor in the intake passage, a portion of the intake passage through which flows intake air (mixed gas) in which EGR gas and fresh air are mixed is large, which increase the response delay of the EGR gas. Therefore, in the engine equipped with the low pressure-type external EGR device, the above-mentioned inconvenience becomes more conspicuous.

Further, in PTL 1, the throttle valve is provided at a location which is on an upstream side of a connecting portion of the intake passage to the EGR passage and is distant from the combustion chamber. Therefore, even if the throttle valve is controlled to the fully-closed state, the amount of fresh air actually supplied to the combustion chamber does not become 0 immediately but becomes 0 with some time lag. On the other hand, in PTL 2, when the engine is in the decelerating operation state with engine combustion being executed, the throttle valve is controlled to the fully-closed state and the auxiliary intake air amount control valve is merely controlled as described above, and the amount of fresh air actually supplied to the combustion chamber is made too large by the influence of fresh air which is reduced with the above-mentioned time lag, causing too large output power of the engine. This can result in degradation of drivability.

The present invention has been made to provide a solution to the above-described problems, and an object thereof is provide a control system for an internal combustion engine which, when the engine is in a decelerating operation state, can properly control the amount of intake air supplied to a combustion chamber, thereby being capable of avoiding misfiring of the engine and achieving securing of excellent drivability.

Solution to Problem

To attain the above-mentioned object, the invention as claimed in claim 1 is a control system 1 for an internal combustion engine 3 that includes an EGR passage 11a connected to an intake passage 4 and an exhaust passage 5, and is provided with an EGR device 11 for recirculating part of exhaust gases which are exhausted to the exhaust passage 5, as EGR gas, via the EGR passage 11a to the intake passage 4, comprising a throttle valve 6 provided on a downstream side of a connecting portion of the intake passage 4 to the EGR passage 11*a*, for controlling an amount of intake air flowing through the intake passage 4, a bypass passage 13 connected to an upstream side of the connecting portion of the intake passage 4 to the EGR passage 11*a*, and to a downstream side of the throttle valve 6 in the intake passage 4, an auxiliary intake air amount control valve 14 provided in the bypass passage 13, for controlling an auxiliary intake air amount which is an amount of fresh air supplied to a combustion chamber of the engine 3 via the bypass passage 13, operation state-detecting means (crank angle sensor 26, accelerator opening degree sensor 27, ECU 2, in an embodiment (this applies hereinafter throughout this section)), for detecting an operation state of the engine, target auxiliary intake air amount-calculating means (ECU 2, steps 7, 8 in FIG. 3) for calculating a target auxiliary intake air amount SAIRCMD which is necessary for avoiding misfiring of the engine 3, by supplying only the auxiliary intake air amount to the combustion chamber, according to the detected operation state (engine speed NE) of the engine 3, target intake air amount-calculating means (ECU 2, step 1 in FIG. 3) for calculating a target intake air amount GAIRCMD which is a target value of an amount of intake air supplied to the combustion chamber, according to the operation state (engine speed NE, accelerator opening degree AP) of the engine 3, misfire determination means (ECU 2, step 33 in FIG. 4) for determining whether or not the engine misfires, and control means (ECU 2, steps 9 to 11 in FIG. 3) for executing, when the engine 3 is in the decelerating operation state and it is determined that the engine misfires (YES to step 27, YES to step 33 in FIG. 4), misfire avoidance control for controlling the auxiliary intake air amount control valve 14 to be more opened such that the auxiliary intake air amount becomes the calculated target auxiliary intake air amount SAIRCMD, and controlling the throttle valve 6 to be more closed such that the amount of intake air supplied to the combustion chamber becomes the calculated target intake air amount GAIRCMD.

In this internal combustion engine, part of exhaust gases exhausted to the exhaust passage is recirculated as EGR gas to the intake passage via the EGR passage. Further, according to the above-described arrangement, the throttle valve is provided on the downstream side of the connecting portion of the intake passage to the EGR passage, and this throttle valve controls the amount of intake air including fresh air and EGR gas flowing in the intake passage. Further, the bypass passage is connected to the upstream side of the connecting portion of the intake passage to the EGR passage, and to the downstream side of the throttle valve in the intake passage. Therefore, almost only fresh air without almost any EGR gas flows through the bypass passage. Further, the auxiliary intake air amount which is the amount of fresh air supplied to the combustion chamber via the bypass passage is controlled by the auxiliary intake air amount control valve.

Further, according to the detected operation state of the engine, the target auxiliary intake air amount necessary for avoiding misfiring of the engine by supplying only the auxiliary intake air to the combustion chamber is calculated by the target auxiliary intake air amount-calculating means, and the target intake air amount which is a target value of the amount of intake air supplied to the combustion chamber is calculated by the target intake air amount-calculating means. Further, it is determined by the misfire determination means whether or not the engine misfires. Further, when the engine is in a decelerating operation state, and when it is determined that the engine misfires, the misfire avoidance control is executed by the control means whereby the auxiliary intake air amount control valve is controlled to be more opened such that the auxiliary intake air amount becomes the calculated target auxiliary intake air amount, and the throttle valve is controlled to be more closed such that that the amount of intake air supplied to the combustion chamber becomes the calculated target intake air amount.

Thus, when the engine is in the decelerating operation state and when it is determined that the engine misfires, the throttle valve is controlled to be more closed as described above. This reduces the amount of intake air supplied to the combustion chamber, and in parallel therewith, the amount of EGR gas supplied to the combustion chamber is also reduced. Differently from the above-mentioned EGR control valve, the throttle valve is provided not in the EGR passage but in the intake passage closer to the combustion chamber, and hence the response delay of the amount of EGR gas actually supplied to the combustion chamber from the control by the throttle valve is smaller than that from the control by the EGR control valve. Therefore, by the above-described control of the throttle valve, the amount of EGR gas supplied to the combustion chamber can be promptly reduced.

Further, in this case, the auxiliary intake air amount control valve is controlled to be more opened such that the auxiliary intake air amount, which is the amount of fresh air supplied to the combustion chamber via the bypass passage, becomes the target auxiliary intake air amount, and this target auxiliary intake air amount is calculated according to the operation state of the engine to an amount necessary for avoiding misfiring of the engine by supplying only the auxiliary intake air amount to the combustion chamber. Further, since the bypass passage is connected to the upstream side and downstream side of the throttle valve in the intake passage, the above-described control of the auxiliary intake air amount can be executed almost without being influenced by the control of intake air by the throttle valve. From the above, when the engine is in the decelerating operation state, it is possible to ensure sufficient fresh air, and in combination with the above-mentioned reduction of the amount of EGR gas, avoid misfiring of the engine.

Further, when the engine is in the decelerating operation state, and it is determined that the engine misfires, the throttle valve is controlled such that the amount of intake air supplied to the combustion chamber, i.e. the total amount of intake air as a total of fresh air and EGR gas passing through the throttle valve and fresh air passing through the bypass passage becomes the target intake air amount, and this target intake air amount is calculated according to the operation state of the engine at the time. Further, differently from the above-described conventional case, the throttle valve is provided on the downstream side of the connecting portion of the intake passage to the EGR passage, at a location closer to the combustion chamber, the response delay of the amount of intake air actually supplied to the combustion chamber from the control of the throttle valve is smaller than that of the conventional case. From the above, when the engine is in the decelerating operation state, the amount of intake air supplied to the combustion chamber can be properly controlled, and in turn, excellent drivability can be obtained.

Figure 3:
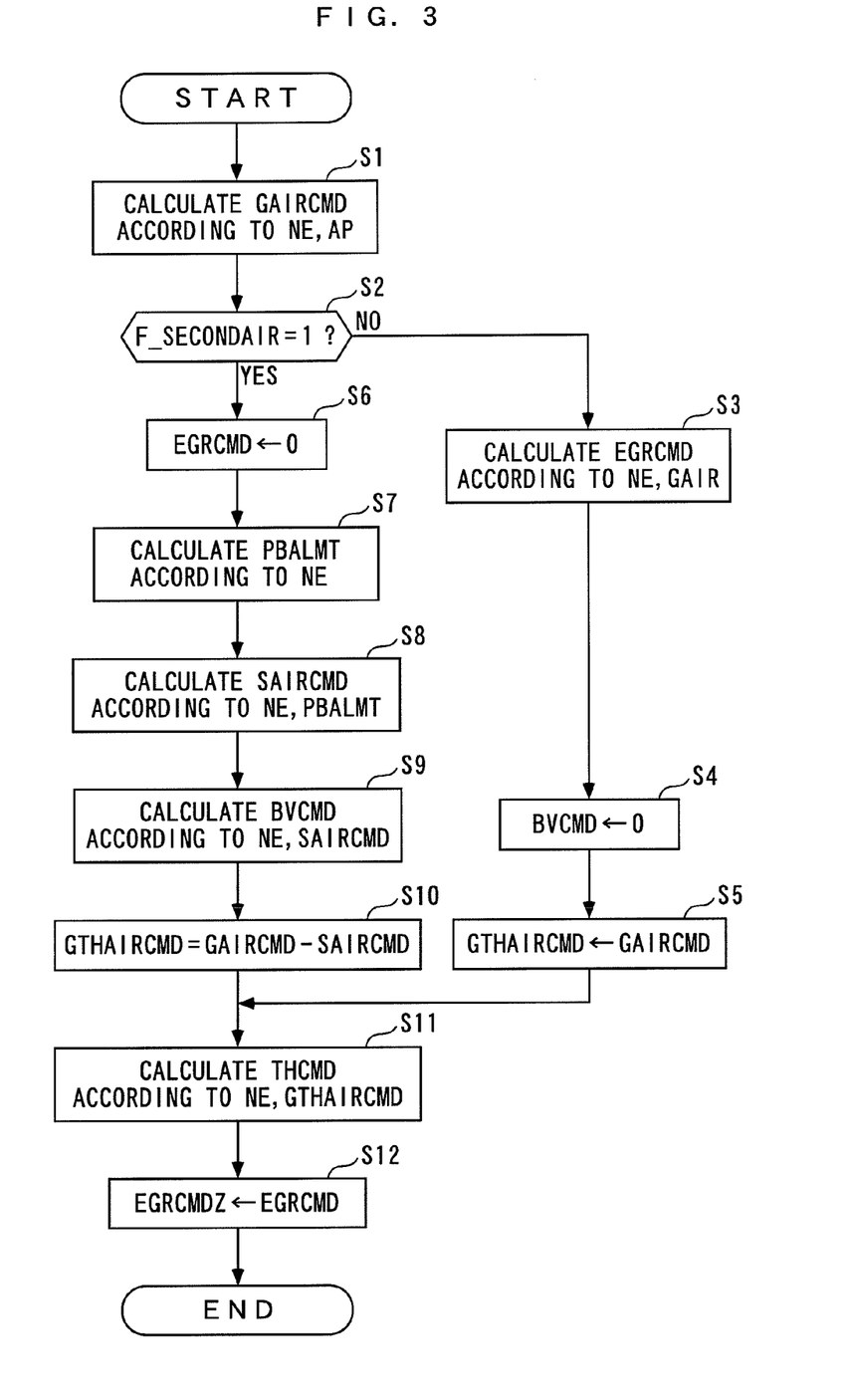
[FIG. 3] A flowchart showing a process, executed by the ECU, for controlling intake air supplied to a combustion chamber of the engine.

The invention as claimed in claim 2 is the control system 1 as claimed 1, wherein during execution of the misfire avoidance control, the control means executes controlling the throttle valve 6 to be more closed, according to the target auxiliary intake air amount SAIRCMD (steps 10, 11 in FIG. 3).

With this configuration, during execution of the misfire avoidance control described in the explanation of claim 1, when the throttle valve is controlled to be more closed such that the amount of intake air supplied to the combustion chamber becomes the target intake air amount, the control is executed according to not only the target intake air amount but also the target auxiliary intake air amount. This makes it possible to properly control the amount of intake air passing through the throttle valve such that the total amount of intake air to which the auxiliary intake air amount is added becomes the target intake air amount. Therefore, it is possible to more properly control the total amount of intake air supplied to the combustion chamber and in turn positively ensure excellent drivability. Further, in this case, the control of the auxiliary intake air amount to the target auxiliary intake air amount can be executed in preference to the control of the amount of intake air amount passing through the throttle valve, and hence it is possible to effectively obtain the advantageous effect described in the explanation of claim 1, i.e. the advantageous effect that sufficient fresh air can be ensured.

The invention as claimed in claim 3 is the control system 1 as claimed 1 or 2, wherein during execution of the misfire avoidance control, the control means controls the throttle valve 6 such that the throttle valve 6 is not brought to a fully-closed state (step 11 in FIG. 3).

As is clear from the positional relationship between the EGR passage and the throttle valve in the intake passage described in the explanation of claim 1, when the engine is in a decelerating operation state, if the throttle valve is controlled to the fully-closed state by executing the misfire avoidance control, the EGR gas remains in the upstream side of the throttle valve in the intake passage, and deposits and water in the remaining EGR gas come to be attached to the intake passage, resulting in the degradation of the function of the intake passage. Further, when the engine returns from a decelerating operation, if the throttle valve which has been in the fully-closed state is opened, the EGR gas which has been staying in the intake passage can suddenly flow into the combustion chamber, thereby causing a misfire of the engine. According to the above-described configuration, during execution of the misfire avoidance control, the throttle valve is controlled such that it is not brought to the fully-closed state, whereby the above-mentioned inconvenience can be avoided.

The invention as claimed in claim 4 is the control system 1 as claimed in any one of claims 1 to 3, wherein in the intake passage, there are provided a compressor (compressor blade 10a) of a supercharger (supercharging device 10) for supercharging intake air, and an intercooler 12 for cooling intake air, from upstream in a mentioned order, and the intercooler 12 is provided on the upstream side of the throttle valve 6 in the intake passage, and wherein the EGR passage 11a is connected to an upstream side of the compressor in the intake passage 4.

With this arrangement, the compressor of the supercharger and the intercooler are provided in the intake passage, from upstream in the mentioned order, and the intercooler is provided on the upstream side of the throttle valve in the intake passage. Further, the EGR passage is connected to the upstream side of the compressor in the intake passage. As is clear from this arrangement, the EGR device is a so-called low pressure type. As described hereinabove, in the engine equipped with the low pressure-type EGR device, the response delay of the EGR gas is large, so that when the engine is in the decelerating operation state, there is a high possibility of the engine misfiring by the influence of the EGR gas. According to the above-mentioned arrangement, in the engine equipped with such a low pressure-type EGR device, it is possible to more effectively obtain the advantageous effect described in the explanation of claim 1, i.e. the advantageous effect that when the engine is in the decelerating operation state, the misfire can be avoided.

Further, as described in the explanation of claim 3, in a case where the EGR gas remains in the intake passage, by controlling the throttle valve to be the fully-closed state when the engine is in the decelerating operation state, the remaining EGR gas is cooled by the intercooler, from the above-described positional relationship between the EGR passage, the compressor, the intercooler, and the throttle valve, in the intake passage. This causes the EGR gas to be condensed, so that more water is attached to the intake passage and the intercooler. Therefore, in the above-described arrangement, by executing the control of the throttle valve as described in the explanation of claim 3, it is possible to more effectively obtain the advantageous effect that the function of the intake passage can be maintained.

The invention as claimed in claim 5 is the control system 1 as claimed in any one of claims 1 to 4, comprising remaining EGR ratio-estimating means (ECU 2, step 47 in FIG. 5) for estimating a remaining EGR ratio EGRACT which is a ratio of an amount of EGR gas to an amount of remaining intake air remaining on the upstream side of the throttle valve 6 in the intake passage 4, during execution of the misfire avoidance control, and determination means (ECU 2, step 49 in FIG. 5) for determining, according to the estimated remaining EGR ratio EGRACT, whether or not the engine 3 misfires when only the remaining intake air is supplied to the combustion chamber, during execution of the misfire avoidance control, and wherein during execution of the misfire avoidance control, the control means continuously executes the misfire avoidance control when it is determined by the determination means (step 50 in FIG. 5) that the engine 3 misfires, and terminates the misfire avoidance control when it is determined by the determination means (step 51 in FIG. 5) that the engine 3 does not misfire.

During execution of the above-described misfire avoidance control, the throttle valve, which is provided on the downstream of the connecting portion of the intake passage to the ERG passage, is controlled to be more closed, the intake air including fresh air and EGR gas remains on the upstream side of the throttle valve in the intake passage. According to the above-mentioned configuration, during execution of the misfire avoidance control, the ratio of the amount of EGR gas to the amount of the remaining intake air, which remains on the upstream side of the throttle valve in the intake passage, is estimated by the remaining EGR ratio-estimating means.

Further, during execution of the misfire avoidance control, it is determined by the determination means according to the estimated remaining EGR ratio whether or not the engine misfires assuming that only the remaining intake air is supplied to the combustion chamber. In this case, if it is determined that the engine misfires, the misfire avoidance control continues to be executed, whereas if it is determined that the engine does not misfire, the misfire avoidance control is terminated. As a result, it is possible to positively avoid misfiring of the engine caused by the influence of the EGR gas contained in the remaining intake air. Further, the misfire avoidance control is terminated at a time point when the engine does not misfire by the influence of the EGR gas, and the control can return to the normal intake air control using the throttle valve. Therefore, it is possible to ensure excellent drivability immediately after this return.

MODE FOR CARRYING OUT INVENTION

Figure 1:
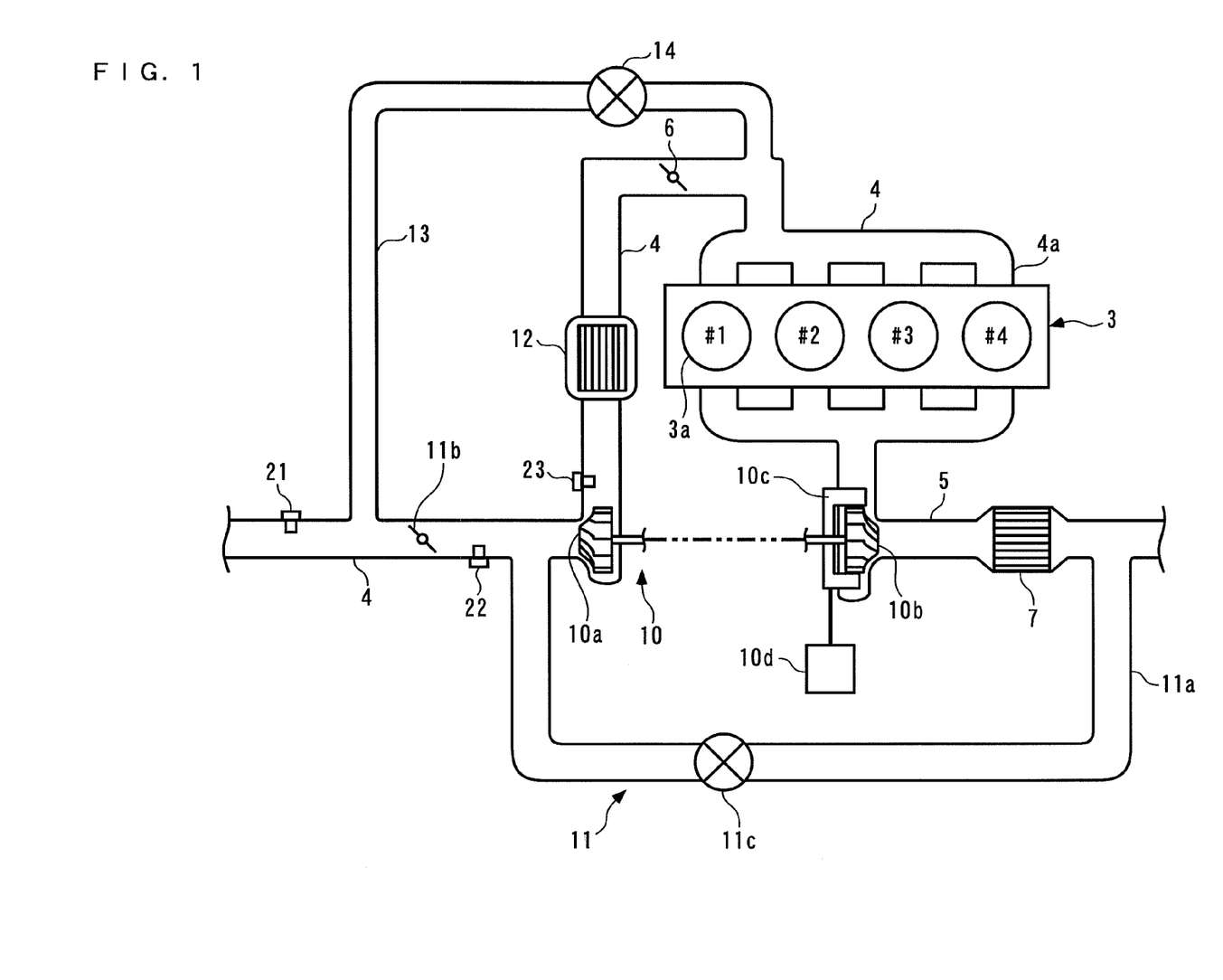
[FIG. 1] A schematic view of an internal combustion engine to which a control system according to the present embodiment is applied.

A preferred embodiment of the present invention will now be described with reference to the drawings. A internal combustion engine (hereinafter referred to as "the engine") 3 shown in FIG. 1 is a four-cycle type gasoline engine which includes four cylinders 3a of #1 to #4. The engine 3 has a cylinder head (not shown) to which are connected an intake passage 4 for introducing intake air to a combustion chamber (not shown) of each cylinder 3a, and an exhaust passage 5 for discharging exhaust gases, exhausted from the combustion chamber, to exterior. Further, the engine 3 is provided with a turbo-type supercharging device 10, and an EGR device 11. Note that, in the present embodiment, "intake air" is intended to mean, when EGR gas, referred to hereinafter, is being recirculated to the intake passage 4, a mixed gas of fresh air and EGR gas, and mean fresh air when the same is not being recirculated.

This supercharging device 10 includes a compressor blade 10a pivotally provided in the intake passage 4, a turbine blade 10b which is provided in the exhaust passage 5 and rotates integrally with the compressor blade 10a, a plurality of variable vane 10c (only two of which are shown), and a vane actuator 10d which drives the vanes 10c. In the supercharging device 10, when the turbine blade 10b is driven by the exhaust gases flowing through the exhaust passage 5, the compressor blade 10a integrally formed therewith rotates at the same time, whereby a supercharging operation for pressurizing intake air in the intake passage 4 is performed.

The variable vanes 10c are pivotally attached to a wall of a housing (not shown) that accommodates the turbine blade 10b, and are connected to the vane actuator 10d. An opening degree of the variable vanes 10c is controlled by inputting a control input signal from an ECU 2, referred to hereinafter, of a control system 1, to the vane actuator 10b. This changes the amount of exhaust gases blown against the turbine blade 10b, and in accordance therewith, the rotational speed of the turbine blade 10b and the compressor blade 10a is changed, whereby supercharging pressure of intake air is controlled.

Further, in the intake passage 4, there are provided an air flow sensor 21, a first EGR control valve 11b of the EGR device 11, an intake air pressure sensor 22, the compressor blade 10a, a boost pressure sensor 23, an intercooler 12, and a throttle valve 6, from upstream in the mentioned order. The air flow sensor 21, which is e.g. of a hot wire type, detects an amount of fresh air (hereinafter referred to as "the fresh air amount") GAIR, and outputs a detection signal indicative of the detected fresh air amount to the ECU 2.

Further, the intake air pressure sensor 22 detects a pressure in the intake passage 4 at a location between the compressor blade 10a and the first EGR control valve 11b, as an intake air pressure PIN, and outputs a detection signal indicative of the detected intake air pressure PIN to the ECU 2. The boost pressure sensor 23 detects a pressure in the intake passage 4 at a location immediately downstream of the compressor blade 10a, as a boost pressure PBST, and outputs a detection signal indicative of the detected boost pressure PBST to the ECU 2.

Further, the intercooler 12 cools intake air when the temperature of intake air is increased by a supercharging operation of the supercharging device 10. The throttle valve 6, which is formed e.g. by a butterfly valve, is disposed at a location in the intake passage 4 upstream of an intake air manifold 4a, and is pivotally provided in the intake passage 4. A TH actuator 6a (see FIG. 2) formed e.g. by a DC motor is connected to the throttle valve 6. An opening degree of the throttle valve 6 (hereinafter referred to as "the throttle valve opening degree") is changed by inputting a control input signal from the ECU 2 to the TH actuator 6a to thereby change the amount of intake air flowing through the intake passage 4. Further, the throttle valve opening degree TH is detected by a throttle valve opening degree sensor 24, and a detection signal indicative of the detected throttle valve opening degree TH is output to the ECU 2.

Further, a catalyst 7 is provided at a location downstream of the turbine blade 10b in the exhaust passage 5. The catalyst 7, which is formed e.g. by a three-way catalyst, oxidizes HC and CO in exhaust gases flowing through the exhaust passage 5, and reduces NOx in the same, to thereby purify the exhaust gases.

Further, the aforementioned EGR device 11 is for recirculating part of exhaust gases flowing through the exhaust passage 5, as EGR gas, to the intake passage 4, and includes an EGR passage 11a, the first EGR control valve 11b, and a second EGR control valve 11c. The EGR passage 11a is connected to a portion of the intake passage 4 between the intake air pressure sensor 22 and the compressor blade 10a, and to a downstream side of the catalyst 7 in the exhaust passage 5.

Further, the first EGR control valve 11b is provided between the air flow sensor 21 and the connecting portion of the intake passage 4 to the EGR passage 11a, and the opening degree thereof is controlled by having a control input signal from the ECU 2 input thereto. The second EGR control valve 11c is provided in the EGR passage 11a, and the opening degree thereof is controlled by having a control input signal from the ECU 2 input thereto.

According to the EGR device 11 constructed as described above, by controlling the opening degree of the first EGR control valve 11b, a differential pressure between the intake passage 4 and the exhaust passage 5, which is necessary for recirculation of the exhaust gases, is ensured, and by controlling the opening degree of the second EGR valve 11c, the amount of EGR gas which is recirculated to the intake passage 4 via the EGR passage 11a is controlled.

Further, a bypass passage 13 is connected to a portion of the intake passage 4 between the air flow sensor 21 and the first EGR control valve 11b, and a downstream side of the throttle valve 6 in the intake passage 4. In the bypass passage 13, there is provided an auxiliary intake air amount control valve 14, and this auxiliary intake air amount control valve 14 is formed e.g. by a combination of a butterfly valve and a DC motor. An opening degree of the auxiliary intake air amount control valve 14 (hereinafter referred to as "the auxiliary intake air amount control valve opening degree") is controlled by having a control input signal from the ECU 2 input to the auxiliary intake air amount control valve 14.

With the above-described arrangement, when the auxiliary intake air amount control valve 14 is open, fresh air is supplied via the bypass passage 13, from the upstream side of the first EGR control valve 11b, in a manner bypassing the compressor blade 10a and the throttle valve 6, and is further supplied to the combustion chamber of the engine 3 via the intake passage 4. Further, by controlling the auxiliary intake air amount control valve opening degree BVACT, the amount of fresh air supplied to the combustion chamber via the bypass passage 13 (hereinafter referred to as "the auxiliary intake air amount") is controlled. Further, the auxiliary intake air amount control valve opening degree BVACT is detected by an auxiliary control valve opening degree sensor 25, and a detection signal indicative of the detected auxiliary intake air amount control valve opening degree BVACT is output to the ECU 2.

Further, the engine 3 is provided with a crank angle sensor 26. The crank angle sensor 26 outputs a CRK signal and a TDC signal, which are pulse signals, to the ECU 2 along with rotation of a crankshaft (not shown) of the engine 3.

The CRK signal is output whenever the crankshaft rotates through a predetermined crank angle (e.g. 30°). The ECU 2, based on the CRK signal, determines the rotational speed (hereinafter referred to as "the engine speed") NE of the engine 3. The TDC signal indicates that each piston (not shown) in an associated one of the cylinders is in a predetermined crank angle position slightly before the TDC (top dead center) position at the start of the intake stroke thereof, and is delivered whenever the crankshaft rotates through 180° when the engine 3 is a four-cylinder type.

Further, an accelerator opening degree sensor 27 outputs a detection signal indicative of an operation amount of an accelerator pedal of a vehicle (neither of which is shown) (hereinafter referred to as "the accelerator opening degree") AP to the ECU 2.

Figure 2:
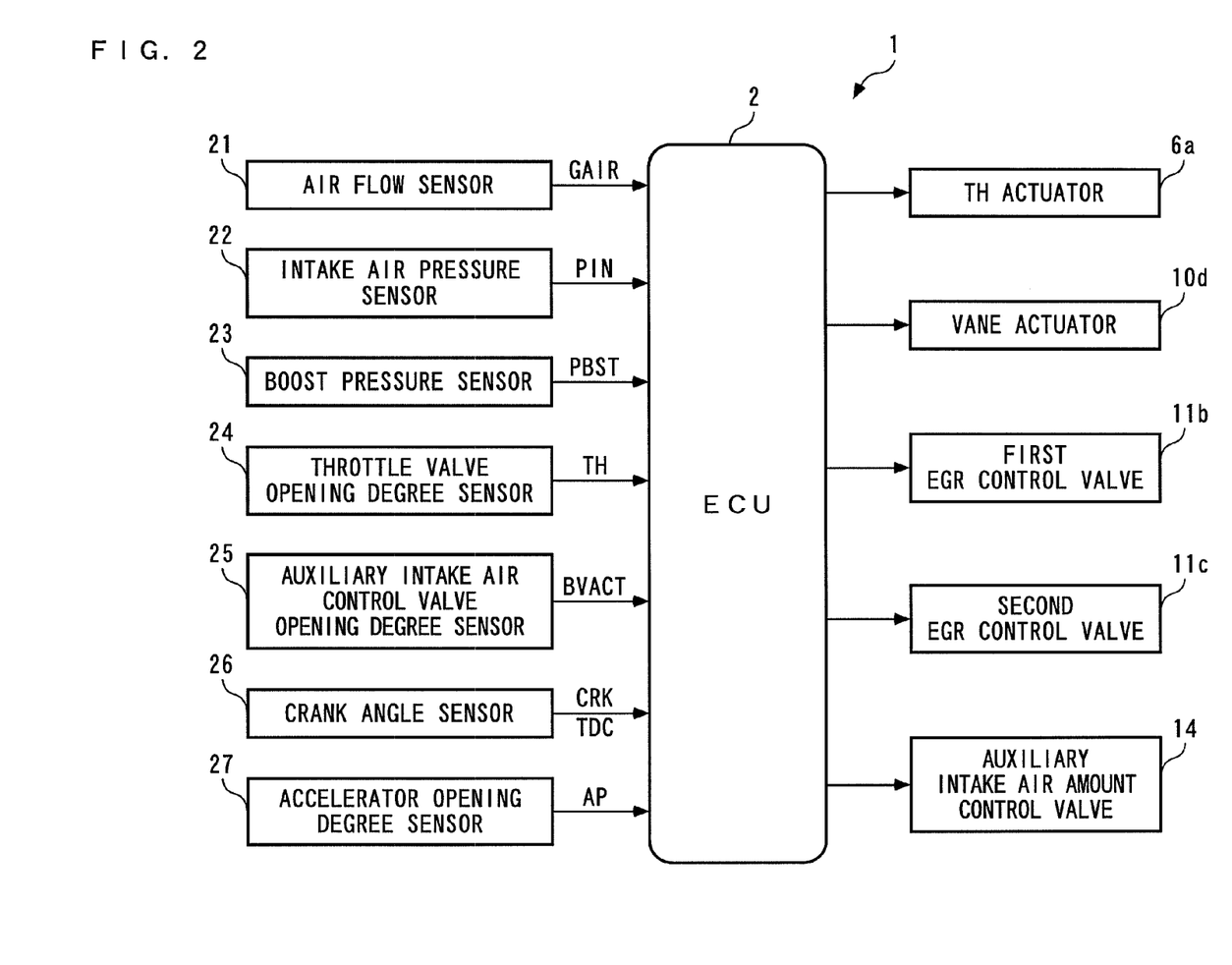
[FIG. 2] A block diagram showing an ECU etc. of the control system.

The ECU 2 is implemented by a microcomputer comprising an I/O interface, a CPU, a RAM, and a ROM. The detection signals from the aforementioned sensors 21 to 27 are input to the CPU after the I/O interface performs A/D conversion and waveform shaping thereon. Based on these detection signals, the ECU 2 determines an operation state of the engine 3 in accordance with control programs stored in the ROM and the like, and executes various processes, based on the determined operating conditions.

Next, a description will be given of an intake air control process for controlling the intake air amount supplied to the combustion chamber of the engine 3, with reference to FIG. 3. The present process is executed repeatedly at a predetermined repetition period. First, in a step 1 (shown as "S1"; the following steps are also shown in the same way) in FIG. 3, a target intake air amount GAIRCMD is calculated by searching a predetermined map (not shown) according to the calculated engine speed NE and the detected accelerator opening degree AP. The target intake air amount GAIRCMD is a target value of the amount of intake air supplied to the combustion chamber.

Next, it is determined whether or not an auxiliary intake air flag F_SECONDAIR is "1" (step 2). The auxiliary intake air flag F_SECONDAIR is set to "1" when conditions for executing intake air control for misfire avoidance are satisfied, and is reset to "0" when the engine 3 is started. Details of the auxiliary intake air flag F_SECONDAIR will be described hereinafter. Further, the intake air control for misfire avoidance is executed to avoid misfiring of the engine 3 which is caused by the influence of the EGR gas when the engine 3 is in a decelerating operation state with engine combustion being executed.

If the answer to the question of the step 2 is NO (F_SECONDAIR=0), which means that the conditions for executing the intake air control for misfire avoidance are not satisfied, in the following step 3 et seq., intake air control for normal operation is executed. First, in the step 3, a target EGR ratio EGRCMD is calculated by searching a predetermined map (not shown) according to the engine speed NE and the detected fresh air amount GAIR. The target EGR ratio EGRCMD is a target value of an EGR ratio, and the EGR ratio is a ratio of the amount of EGR gas to the amount of intake air (fresh air+EGR gas). In this case, when the engine 3 is in the decelerating operation state, the target EGR ratio EGRCMD is calculated to 0. Further, along with the execution of the step 3, the control input signal based on the target EGR ratio EGRCMD is input to the first and second EGR control valves 11b and 11c to thereby control the opening degrees of the first and second EGR control valves 11b and 11c, whereby the EGR ratio is controlled such that it becomes the target EGR ratio EGRCMD.

Next, a target auxiliary intake air amount control valve opening degree BVCMD is set to 0 (step 4). The target auxiliary intake air amount control valve opening degree BVCMD is a target value of the auxiliary intake air amount control valve opening degree BVACT. Further, along with the execution of the step 4, the control input signal based on the target auxiliary intake air amount control valve opening degree BVCMD is input to the auxiliary intake air amount control valve 14 to thereby control the auxiliary intake air amount control valve 14 to the fully-closed state, whereby the auxiliary intake air amount (amount of fresh air supplied to the combustion chamber via the bypass passage 13) is controlled such that it becomes a value of 0.

Next, the target intake air amount GAIRCMD calculated in the step 1 is set to a target throttle valve passing intake air amount GTHAIRCMD (step 5), and the process proceeds to a step 11. The target throttle valve passing intake air amount GTHAIRCMD is a target value of the amount of intake air which passes through the throttle valve 6 (hereinafter referred to as "the throttle valve passing intake air amount").

On the other hand, if the answer to the question of the step 2 is YES (F_SECONDAIR=1), and the conditions for executing the intake air control for misfire avoidance are satisfied, in the following step 6 et seq., the intake air control for misfire avoidance is executed. First, in the step 6, the target EGR ratio EGRCMD is set to 0. Along with the execution of the step 6, the control input signal based on the target EGR ratio EGRCMD is input to the second EGR control valve 11c to thereby control the second EGR control valve 11c to the fully-closed state, whereby the amount of EGR gas which is recirculated to the intake passage 4 is controlled such that it becomes a value of 0.

Next, a limit load PBALMT is calculated (step 7) by searching a predetermined map (not shown) according to the engine speed NE. The limit load PBALMT corresponds to the minimum load with which the engine 3 does not misfire with respect to the engine speed NE at the time. Next, a target auxiliary intake air amount SAIRCMD is calculated by searching a predetermined map (not shown) according to the engine speed NE and the calculated limit load PBALMT (step 8). The target auxiliary intake air amount SAIRCMD is a target value of the auxiliary intake air amount, and by executing the steps 7 and 8, it is calculated to such a value as will make it possible to avoid misfiring of the engine 3 by supplying only the auxiliary intake air to the combustion chamber.

Next, the target auxiliary intake air amount control valve opening degree BVCMD is calculated by searching a predetermined map (not shown) according to the engine speed NE and the calculated target auxiliary intake air amount SAIRCMD (step 9). Along with the execution of the step 9, the control input signal based on the target auxiliary intake air amount control valve opening degree BVCMD is input to the auxiliary intake air amount control valve 14 to thereby control the auxiliary intake air amount control valve opening degree BVACT, whereby the auxiliary intake air amount is controlled such that it becomes the target auxiliary intake air amount SAIRCMD.

Next, the target throttle valve passing intake air amount GTHAIRCMD is calculated by subtracting the target auxiliary intake air amount SAIRCMD calculated in the step 8 from the target intake air amount GAIRCMD calculated in the step 1 (step 10), and the process proceeds to the step 11. In the step 10, the target throttle valve passing intake air amount GTHAIRCMD is always calculated to a value larger than a value of 0.

Further, in the step 11, a target throttle valve opening degree THCMD is calculated by searching a predetermined map (not shown) according to the engine speed NE and the target throttle valve passing intake air amount GTHAIRCMD obtained in the step 5 or 10. Next, the target EGR ratio EGRCMD is shifted to the preceding value EGRCMDZ thereof (step 12), followed by terminating the present process. The target throttle valve opening degree THCMD is a target value of the throttle valve opening degree TH. Further, along with the execution of the step 11, the control input signal based on the target throttle valve opening degree THCMD is input to the TH actuator 6a to thereby control the throttle valve opening degree TH, whereby the throttle valve passing intake air amount is controlled such that it becomes the target throttle valve passing intake air amount GTHAIRCMD.

As described above, in normal intake air control, the supply of fresh air via the bypass passage 13 to the combustion chamber of the engine 3 is stopped by controlling the auxiliary intake air amount control valve 14 to the fully-closed state. Further, the intake air supplied to the combustion chamber is controlled by the throttle valve 6.

Further, in the intake air control for misfire avoidance, the target auxiliary intake air amount control valve opening degree BVCMD is calculated according to the target auxiliary intake air amount SAIRCMD, and the auxiliary intake air amount control valve opening degree BVACT is controlled according to the calculated target auxiliary intake air amount control valve opening degree BVCMD. This controls the auxiliary intake air amount control valve 14 to be more opened than in the case of the normal intake air control such that the auxiliary intake air amount becomes the target auxiliary intake air amount SAIRCMD.

Further, in the intake air control for misfire avoidance, in addition to the intake air passing through the throttle valve 6, fresh air passing through the bypass passage 13 is supplied to the combustion chamber. On the other hand, the target throttle valve passing intake air amount GTHAIRCMD is calculated by subtracting the target auxiliary intake air amount SAIRCMD from the target intake air amount GAIRCMD, and the throttle valve opening degree TH is controlled according to the calculated target throttle valve passing intake air amount GTHAIRCMD. This controls the throttle valve passing intake air amount such that it becomes the target throttle valve passing intake air amount GTHAIRCMD calculated as described above, and the auxiliary intake air amount such that it becomes the target auxiliary intake air amount SAIRCMD, as described above, whereby the total amount of intake air as the total of the throttle valve passing intake air amount and the auxiliary intake air amount is controlled such that it becomes the target intake air amount GAIRCMD.

Further, although the target throttle valve passing intake air amount GTHAIRCMD is set to the target intake air amount GAIRCMD in the normal intake air control, it is calculated, in the intake air control for misfire avoidance, to a smaller value than the target intake air amount GAIRCMD as is clear from the above calculation method. This controls, in the intake air control for misfire avoidance, the throttle valve 6 to be more closed than in the case of the normal intake air control. Further, in the intake air control for misfire avoidance, the target throttle valve passing intake air amount GTHAIRCMD is calculated to a larger value than 0, and hence the throttle valve 6 is controlled not to become the fully-closed state.

Next, a description will be given of a process for determining whether or not the conditions for executing the intake air control for misfire avoidance are satisfied, with reference to FIG. 4. The present process is repeatedly executed at a predetermined repetition period, similarly to the process shown in FIG. 3. First, in a step 21 in FIG. 4, the auxiliary intake air flag F_SECONDAIR obtained at the time is shifted to the immediately preceding value F_SECONDAIRZ thereof.

Next, it is determined whether or not the set immediately preceding value of the auxiliary intake air flag F_SECONDAIRZ is "0" (step 22). If the answer to this question is NO, the accelerator opening degree AP is shifted to the immediately preceding value APZ thereof (step 23), followed by terminating the present process. On the other hand, if the answer to the question of the step 22 is YES (F_SECONDAIRZ=0), which means that the conditions for executing the intake air control for misfire avoidance were not satisfied last time, it is determined whether or not a fuel cut flag F_F/C is "0" (step 24).

The fuel cut flag F_F/C is set to "1" when the engine 3 is in the decelerating operation state or when the fuel cut that cuts supply of fuel to the engine 3 during high-speed operation of the engine 3 is being executed. If the answer to the question of the step 24 is NO, which means that the fuel cut is being executed, it is judged that the conditions for executing the intake air control for misfire avoidance are not satisfied since the combusting operation is not being executed in the engine 3, so that the auxiliary intake air flag F_SECONDAIR is set to "0" (step 25), and the step 23 is executed, followed by terminating the present process.

On the other hand, if the answer to the question of the step 24 is YES (F_F/C=0), which means that the fuel cut is not being executed but the combusting operation of the engine 3 is being executed, an accelerator opening degree change amount ΔAP is calculated by subtracting the immediately preceding value APZ of the detected accelerator opening degree from the present value AP of the same (step 26).

Next, it is determined whether or not the calculated accelerator opening degree change amount ΔAP is smaller than 0, and at the same time the absolute value |ΔAP| of the accelerator opening degree change amount is larger than a predetermined value ΔAPREF (step 27). If the answer to this question is NO, i.e. if the accelerator opening degree change amount ΔAP is not smaller than 0, or the absolute value |ΔAP| of the accelerator opening degree change amount is not larger than the predetermined value ΔAPREF, it is judged that the conditions for executing the intake air control for misfire avoidance are not satisfied, so that the step 25 et seq. are executed, followed by terminating the present process.

The reason for judging that the conditions for executing the intake air control for misfire avoidance are not satisfied when the answer to the question of the step 27 is NO is as follows: When the accelerator opening degree change amount ΔAP is larger than 0, the engine 3 is not in the decelerating operation state, and hence it is unnecessary to execute the intake air control for misfire avoidance. Further, even when the accelerator opening degree change amount ΔAP is smaller than 0, which means that the engine 3 is in the decelerating operation state, if the absolute value |ΔAP| of the accelerator opening degree change amount is relatively small, the deceleration degree of the engine 3 is small, which means that the engine 3 is in a relatively stable operation state, and hence the possibility of misfiring by the influence of the EGR gas is low.

On the other hand, if the answer to the question of the step 27 is YES, i.e. if the engine 3 is in the decelerating operation state with engine combustion being executed and the deceleration degree is relatively large, it is determined whether or not a remaining EGR flag F_EGRSTAY is "1" (step 28). The remaining EGR flag F_EGRSTAY represents, by "1", that the EGR gas remains in a portion of the intake passage 4 between the throttle valve 6 and the connecting portion of the intake passage 4 to the EGR passage 11a, and a portion of the EGR passage 11a downstream of the second EGR control valve 11c. Further, the remaining EGR flag F_EGRSTAY is set based on the target EGR ratio EGRCMD assumed immediately before the answer to the question of the step 27 becomes YES, i.e. immediately before the engine 3 starts a decelerating operation. Hereinafter, the portion of the intake passage 4 between the throttle valve 6 and the connecting portion of the intake passage 4 to the EGR passage 11a, and the portion of the EGR passage 11a downstream of the second EGR control valve 11c are collectively referred to as "the portion where fresh air and EGR gas are mixed".

If the answer to the question of the step 28 is NO (F_EGRSTAY=0), i.e. if the EGR gas does not remain in the portion where fresh air and EGR gas are mixed, it is judged that the conditions for executing the intake air control for misfire avoidance are not satisfied, and the step 25 et seq. are executed, followed by terminating the present process. This is because when the EGR gas does not remain in the portion where fresh air and EGR gas are mixed, there is no fear of the engine 3 misfiring by the influence of the EGR gas, and hence it is unnecessary to execute the intake air control for misfire avoidance.

On the other hand, if the answer to the question of the step 28 is YES, i.e. if the engine 3 is in the decelerating operation state with engine combustion being executed, and the deceleration degree is relatively large, with the EGR gas remaining in the portion where fresh air and EGR gas are mixed, a target EGR ratio EGRMFCMD for determination of a misfire is calculated by searching a predetermined map (not shown) according to the engine speed NE and the fresh air amount GAIR (step 29).

Next, a predicted accelerator opening degree PREAP is calculated by adding the accelerator opening degree change amount ΔAP calculated in the step 26 to the accelerator opening degree AP (step 30). The predicted accelerator opening degree PREAP is a predicted value of the accelerator opening degree AP. Next, a predicted fresh air amount PREGAIR is calculated by searching a predetermined map (not shown) according to the engine speed NE and the calculated predicted accelerator opening degree PREAP (step 31). This predicted fresh air amount PREGAIR is a predicted value of the fresh air amount GAIR.

Next, a predicted limit EGR ratio PREEGRLMT is calculated (step 32) by searching a map (not shown) according to the engine speed NE and the calculated predicted fresh air amount PREGAIR. The predicted limit EGR ratio PREEGRLMT corresponds to the maximum value of the EGR ratio with which the engine 3 does not misfire, when the engine 3 is in an operation state represented by the engine speed NE and the predicted fresh air amount PREGAIR. That is, the predicted limit EGR ratio PREEGRLMT corresponds to the maximum value of a predicted value of the EGR ratio with which the engine 3 does not misfire. In the above-mentioned map, the predicted limit EGR ratio PREEGRLMT is set to a larger value as the engine speed NE is higher and the predicted fresh air amount PREGAIR is larger.

Next, it is determined whether or not the target EGR ratio EGRMFCMD calculated in the step 29 is larger than the predicted limit EGR ratio PREEGRLMT calculated in the step 32 (step 33). If the answer to this question is NO, it is regarded that there is no fear of the engine 3 misfiring by the influence of the EGR gas, and it is judged that the conditions for executing the intake air control for misfire avoidance are not satisfied, so that the step 25 et seq. are executed, followed by terminating the present process.

On the other hand, if the answer to the question of the step 33 is YES, which means that the target EGR ratio EGRMFCMD is larger than the predicted limit EGR ratio PREEGRLMT, it is regarded that there is a fear of the engine 3 misfiring by the influence of the EGR gas and it is judged that the conditions for executing the intake air control for misfire avoidance are satisfied, so that the auxiliary intake air flag F_SECONDAIR is set to "1" (step 34), and the step 23 is executed, followed by terminating present process.

As described above, based on the result of a comparison between the target EGR ratio EGRMFCMD and the predicted limit EGR ratio PREEGRLMT at the time, it is determined that there is a fear of the engine 3 misfiring by the influence of the EGR gas, for the following reason: Since the EGR gas flows into the combustion chamber of the engine 3 with time lag, the target EGR ratio EGRMFCMD, which is calculated according to the engine speed NE and the fresh air amount GAIR at the time, corresponds to the EGR ratio of intake air which flows into the combustion chamber next time or thereafter. Further, the predicted limit EGR ratio PREEGRLMT is the maximum value of the predicted value of the EGR ratio with which the engine 3 does not misfire, and corresponds to the maximum value of the EGR ratio with which the engine 3 does not misfire next time or thereafter. From the above, the reason is that based on the result of a comparison between the target EGR ratio EGRMFCMD and the predicted limit EGR ratio PREEGRLMT, it is possible to appropriately determine (predict) whether or not the engine 3 will misfire by the influence of the EGR gas next time or thereafter.

Figure 4:
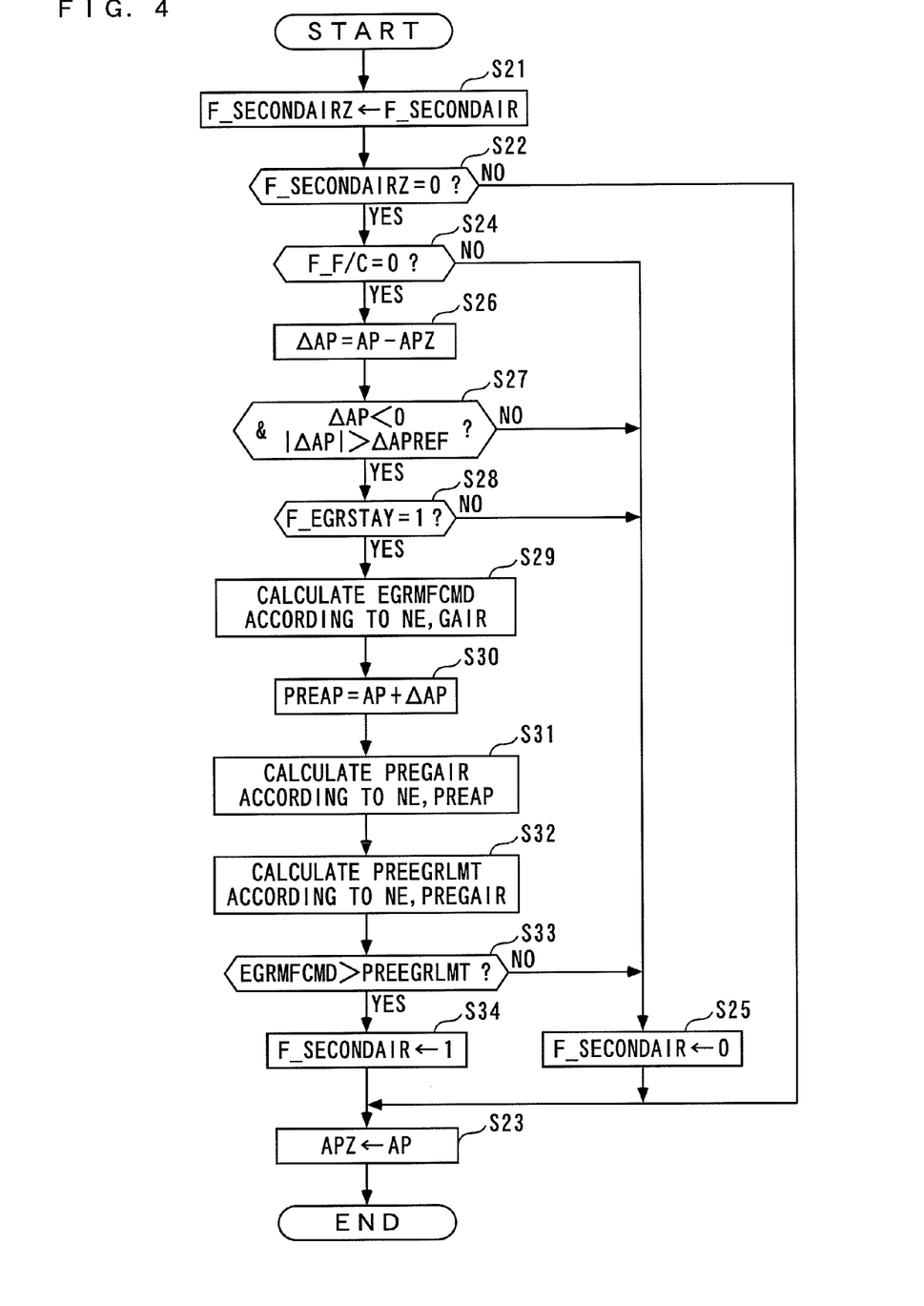
[FIG. 4] A flowchart showing a process, executed by the ECU, for determining whether or not conditions for executing intake air control for misfire avoidance are satisfied.
Figure 5:
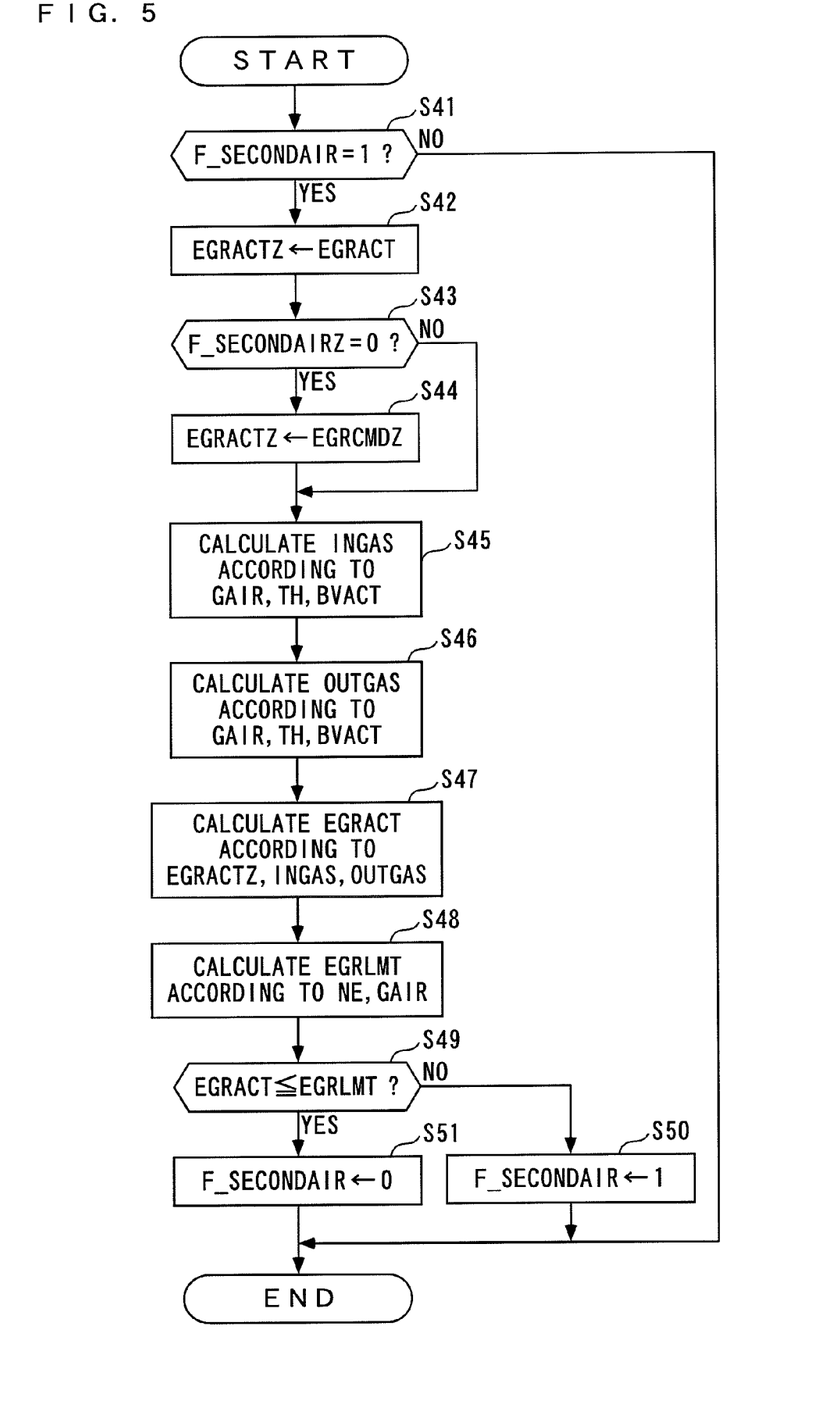
[FIG. 5] A flowchart showing a process, executed by the ECU, for determining whether or not to terminate the intake air control for misfire avoidance.

Further, once the intake air control for misfire avoidance is started (steps 6 to 11 in FIG. 3) because of satisfaction of the executing conditions (step 34 in FIG. 4), it is continuously executed thereafter until it is determined by a termination determining process shown in FIG. 5 that there is no fear of the engine 3 misfiring by the influence of the EGR gas. Hereinafter, the termination determining process will be described. The present process is repeatedly executed at a predetermined repletion period, similarly to the processes shown in FIG. 3 and FIG. 4.

First, in a step 41 in FIG. 5, it is determined whether or not the auxiliary intake air flag F_SECONDAIR is "1". If the answer to this question is NO, the present process is immediately terminated, whereas if the answer to this question is YES, i.e. if the executing conditions for the intake air control for misfire avoidance are satisfied, and hence the control is being executed, a remaining EGR ratio EGRACT obtained at the time is shifted to the immediately preceding value EGRACTZ thereof (step 42).

Here, the remaining EGR ratio will be described. As described hereinabove, when the intake air control for misfire avoidance is started, the throttle valve 6 is controlled to be more closed, which makes intake air difficult to flow downstream of the throttle valve 6 of the intake passage 4, whereby intake air remains upstream of the throttle valve 6 of the intake passage 4 after the intake air control for misfire avoidance is started. The remaining EGR ratio corresponds to the EGR ratio of this remaining intake air.

In a step 43 following the step 42, it is determined whether or not the auxiliary intake air flag F_SECONDAIRZ, which is set in the step 21 in FIG. 4, is "0". If the answer to this question is YES, i.e. if this time corresponds to a loop immediately after starting the intake air control for misfire avoidance, the immediately preceding value EGRCMDZ of the target EGR ratio is set as the immediately preceding value EGRACTZ of the remaining EGR ratio (step 44), and the process proceeds to a step 45, referred to hereinafter. On the other hand, if the answer to the question of the step 43 is NO, i.e. if this time does not correspond to a loop immediately after starting the intake air control for misfire avoidance, the process skips the step 44 to proceed to the step 45.

The reason for setting, described above, the immediately preceding value EGRCMDZ of the target EGR ratio as the immediately preceding value EGRACTZ of the remaining EGR ratio when this time corresponds to a loop immediately after starting the intake air control for misfire avoidance is that the immediately preceding value EGRCMDZ of the target EGR ratio corresponds to an actual EGR ratio immediately before starting the intake air control for misfire avoidance.

Further, in the step 45, an inflow intake air amount INGAS is calculated by searching a predetermined map (not shown) according to the fresh air amount GAIR, and the detected throttle valve opening degree TH and auxiliary intake air amount control valve opening degree BVACT. The inflow intake air amount INGAS corresponds to an amount of intake air which flows into the upstream side of the throttle valve 6 in the intake passage 4, in the present processing cycle of the present process.

Next, an outflow intake air amount OUTGAS is calculated (step 46) by searching a predetermined map (not shown) according to the fresh air amount GAIR, the throttle valve opening degree TH, and the auxiliary intake air amount control valve opening degree BVACT. The outflow intake air amount OUTGAS corresponds to an amount of intake air which flows out downstream of the throttle valve 6 in the intake passage 4 in the present processing cycle of the present process.

As mentioned hereinbefore, the bypass passage 13 is connected to the downstream side of the air flow sensor 21 in the intake passage 4, and hence the fresh air amount GAIR detected by the air flow sensor 21 corresponds to the sum of the amount of intake air which flows through a portion of the intake passage 4 downstream of the air flow sensor 21 and the amount of intake air which flows through the bypass passage 13. Further, the throttle valve opening degree TH is in a close correlation with the throttle valve passing intake air amount, and the auxiliary intake air amount control valve opening degree BVACT is in a close correlation with the intake air amount which flows through the bypass passage 13, respectively. Therefore, according to the fresh air amount GAIR, the throttle valve opening degree TH, and the auxiliary intake air amount control valve opening degree BVACT, the inflow intake air amount INGAS can be properly calculated as the amount of intake air which flows into the upstream side of the throttle valve 6 in the intake passage 4, and the outflow intake air amount OUTGAS can be properly calculated as the amount of intake air which flows out downstream of the throttle valve 6 in the intake passage 4, respectively.

Further, in a step 47 following the step 46, the present value EGRACT of the remaining EGR ratio is calculated by searching a predetermined map (not shown) according to the immediately preceding value EGRACTZ of the remaining EGR ratio, which is set in the steps 42 or 44, and the inflow intake air amount INGAS and the outflow intake air amount OUTGAS, which are calculated in the steps 45 and 46, respectively.

As described hereinabove, during execution of the intake air control for misfire avoidance, the recirculation of the EGR gas to the intake passage 4 is stopped by the step 6 in FIG. 3, and hence the EGR gas does not flow into the upstream side of the throttle valve 6 in the intake passage 4, but only fresh air flows in. This causes the remaining EGR ratio EGRACT, i.e. the EGR ratio of intake air remaining upstream of the throttle valve 6 in the intake passage 4 to be reduced due to flow-in of intake air (fresh air) to the upstream side of the throttle valve 6 in the intake passage 4, and flow-out of intake air downstream of the throttle valve 6. Therefore, the remaining EGR ratio EGRACT can be properly calculated, according to the immediately preceding value EGRACTZ of the remaining EGR ratio, the inflow intake air amount INGAS, which is the amount of intake air which flows into the upstream side of the throttle valve 6 in the intake passage 4, and the outflow intake air amount OUTGAS, which is the amount of intake air amount which flows out downstream of the throttle valve 6.

Further, in a step 48 following the step 47, a limit EGR ratio EGRLMT is calculated by searching a predetermined map (not shown) according to the engine speed NE and fresh air amount GAIR. The limit EGR ratio EGRLMT corresponds to the maximum value of the EGR ratio with which the engine 3 does not misfire, in an operation state of the engine 3 which is represented by the engine speed NE and the fresh air amount GAIR.

Next, it is determined whether or not the remaining EGR ratio EGRACT calculated in the step 47 is not larger than the limit EGR ratio EGRLMT calculated in the step 48 (step 49). If the answer to this question is NO, it is determined that, if the supply of fresh air to the combustion chamber via the bypass passage 13 is terminated by terminating the intake air control for misfire avoidance, and only intake air which is remaining upstream of the throttle valve 6 in the intake passage 4 is supplied to the combustion chamber, there is a fear of the engine 3 misfiring by the influence of the EGR gas. Further, according to this result of the determination, in order to continue to execute the intake air control for misfire avoidance with a view to avoiding misfiring of the engine 3, the auxiliary intake air flag F_SECONDAIR is held at "1" (step 50), followed by terminating the present process.

On the other hand, if the answer to the question of the step 49 is YES, which means that the remaining EGR ratio EGRACT is smaller than the limit EGR ratio EGRLMT, it is determined that, even if the supply of fresh air to the combustion chamber via the bypass passage 13 is terminated by terminating the intake air control for misfire avoidance, there is no fear of the engine 3 misfiring by the influence of the EGR gas. Then, according to this result of the determination, the intake air control for misfire avoidance is terminated, and in order to return to the normal intake air control, the auxiliary intake air flag F_SECONDAIR is reset to "0" (step 51), followed by terminating the present process.

Correspondences between various elements of the present embodiment and various elements of the present invention are as follows: The ECU 2 in the present embodiment corresponds to operation state-detecting means, target auxiliary intake air amount-calculating means, target intake air amount-calculating means, misfire determination means, control means, remaining EGR ratio-estimating means and determination means in the present invention. Further, the supercharging device 10 and the compressor blade 10a in the present embodiment correspond to a supercharger and a compressor in the present invention, respectively. Further, the crank angle sensor 26 and the accelerator opening degree sensor 27 in the present embodiment correspond to operation state-detecting means in the present invention. Further, the engine speed NE and the accelerator opening degree AP in the present embodiment correspond to an operation state of an internal combustion engine in the present invention.

As described above, according to the present embodiment, the throttle valve 6 is provided on the downstream side of the connecting portion of the intake passage 4 to the EGR passage 11, and the amount of intake air including fresh air and EGR gas flowing through the intake passage 4 is controlled by the throttle valve 6. Further, the bypass passage 13 is connected to the upstream side of the connecting portion of the intake passage 4 to the EGR passage 11a, and to the downstream side of the throttle valve 6 in the intake passage 4. Therefore, almost only fresh air without almost any EGR gas flows through the bypass passage 13. Further, the auxiliary intake air amount which is the amount of fresh air supplied to the combustion chamber via the bypass passage 13 is controlled by the auxiliary intake air amount control valve 14.

Further, when the engine 3 is in the decelerating operation state with engine combustion being executed, and at the same time it is determined that the engine 3 misfires (YES to the step 24; YES to the step 27; YES to the step 33, in FIG. 4), the intake air control for misfire avoidance is executed. Further, during execution of the intake air control for misfire avoidance, the target auxiliary intake air amount SAIRCMD necessary for avoiding misfiring of the engine 3 by supplying only the auxiliary intake air to the combustion chamber is calculated according to the engine speed NE (the steps 7 and 8 in FIG. 3), and the target intake air amount GAIRCMD, which is the target value of the amount of intake air supplied to the combustion chamber, is calculated according to the engine speed NE and the accelerator opening degree AP (the step 1 in FIG. 3). Further, the auxiliary intake air amount control valve 14 is controlled to be more opened such that the auxiliary intake air amount becomes the calculated target auxiliary intake air amount SAIRCMD (the step 9 in FIG. 3), and the throttle valve 6 is controlled to be more closed such that the amount of intake air supplied to the combustion chamber becomes the calculated target intake air amount GAIRCMD (the steps 10 and 11).

As described above, when the engine 3 is in the decelerating operation state with engine combustion being executed, the amount of EGR gas supplied to the combustion chamber can be promptly reduced, and sufficient fresh air can be ensured, which makes it possible to avoid misfiring of the engine 3. In addition to this, when the engine 3 is in the decelerating operation state with engine combustion being executed, the amount of intake air supplied to the combustion chamber can be properly controlled, and in turn, excellent drivability can be ensured.

Further, during execution of the intake air control for misfire avoidance, in controlling the throttle valve 6 to be more closed such that the amount of intake air supplied to the combustion chamber becomes the target intake air amount GAIRCMD, this control is executed according to not only the target intake air amount GAIRCMD but also the target auxiliary intake air amount SAIRCMD (the steps 10 and 11 in FIG. 3). This makes it possible to properly control the throttle valve passing intake air amount such that the total amount of intake air as a total of the throttle valve passing intake air amount and the auxiliary intake air amount becomes the target intake air amount GAIRCMD. Therefore, it is possible to more properly control the total amount of intake air supplied to the combustion chamber, and in turn, it is possible to ensure excellent drivability. Further, in this case, the control of the auxiliary intake air amount to the target auxiliary intake air amount SAIRCMD can be executed in preference to the control of the throttle valve passing intake air amount, and hence it is possible to effectively obtain the above-mentioned advantageous effect, i.e. the effect that fresh air can be sufficiently ensured.

Further, as is clear from the positional relationship between the EGR passage 11a and the throttle valve 6 in the intake passage 4, when the engine 3 is in the decelerating operation state with engine combustion being executed, if the throttle valve 6 is controlled to the fully-closed state, the EGR gas stays upstream of the throttle valve 6 in the intake passage 4, and deposits and water in the staying EGR gas come to be attached to the intake passage 4, which can result in degradation of the function of the intake passage 4. In this case, the staying EGR gas is condensed through cooling by the intercooler 12, whereby more water is attached to the intake passage 4 and the intercooler 12. Further, when the engine 3 returns from decelerating operation, if the throttle valve 6 which has been in the fully-closed state is opened, the EGR gas having been staying in the intake passage 4 suddenly flows into the combustion chamber, which can cause misfiring of the engine 3. According to the present embodiment, during execution of the intake air control for misfire avoidance when the engine 3 is in the decelerating operation state with engine combustion being executed, the throttle valve 6 is controlled such that that it is not brought to the fully-closed state, whereby the above-mentioned inconvenience can be avoided.

Further, the EGR device 11 is a so-called low pressure type, and in the engine 3 equipped with the EGR device 11, the response delay of the EGR gas is large, so that when the engine 3 is in the decelerating operation state with engine combustion being executed, there is a high possibility that the engine 3 misfires by the influence of the EGR gas. According to the present embodiment, in such an engine 3, it is possible to more effectively obtain the above-mentioned effect, i.e. the effect that when the engine 3 is in the decelerating operation state with engine combustion being executed, misfiring can be avoided.

Further, during execution of the intake air control for misfire avoidance, it is determined according to the remaining EGR ratio EGRACT whether or not the engine 3 misfires (the step 49 in FIG. 5), assuming that the only intake air remaining upstream of the throttle valve 6 of the intake passage 4 is supplied to the combustion chamber. In this case, when it is determined that the engine 3 misfires (NO to the step 49), the intake air control for misfire avoidance continues to be executed (the step 50), whereas when it is determined that the engine 3 does not misfire, the intake air control for misfire avoidance is terminated (the step 51). As a result, it is possible to positively avoid misfiring of the engine 3 caused by the influence of the EGR gas contained in intake air remaining upstream of the throttle valve 6 in the intake passage 4. Further, when no misfiring of the engine 3 will be caused by the influence of the EGR gas, the intake air control for misfire avoidance is terminated, and the control can return to the normal intake air control using the throttle valve 6. This makes it possible to ensure excellent drivability of the engine 3 immediately after the return.

Note that the present invention is by no means limited to the embodiment described above, but can be put into practice in various forms. For example, the connecting position of the downstream end of the bypass passage 13 to the intake passage 4 is illustrated in the embodiment, only by way of example, and the connecting position can be set as desired insofar as it is downstream of the throttle valve 6 in the intake passage 4. For example, the bypass passage 13 may be connected to the intake air manifold 4a or to an air intake port of the intake passage 4. Further, although in the embodiment, during execution of the intake air control for misfire avoidance, the target throttle valve passing intake air amount GTHAIRCMD is once calculated according to the target intake air amount GAIRCMD and the target auxiliary intake air amount SAIRCMD, and further, the target throttle valve opening degree THCMD is calculated according to the target throttle valve passing intake air amount GTHAIRCMD, the target throttle valve opening degree THCMD may be calculated according to the target intake air amount GAIRCMD and the target auxiliary intake air amount SAIRCMD, without calculating the target throttle valve passing intake air amount GTHAIRCMD.

Further, although in the embodiment, the remaining EGR ratio EGRACT is calculated by searching the map, but it may be calculated by a predetermined computing equation. Further, although the embodiment is an example in which the control system 1 is applied to the engine 3 equipped with the supercharging device 10 and the intercooler 12, but it can be applied to an internal combustion engine from which the two 10 and 12 are omitted. Furthermore, the control system 1 can be applied to various industrial internal combustion engines, including diesel engines, LPG engines, engines for ship propulsion machines, such as an outboard motor having a vertically-disposed crankshaft. Further, it is possible to alter or modify details of the arrangement on an as-needed basis, without departing from the spirit and scope of the present invention.

INDUSTRIAL APPLICABILITY

The control system for an internal combustion engine according to the present invention is very useful in properly controlling the amount of intake air supplied to a combustion chamber when the engine is in a decelerating operation state, for thereby avoiding misfire of the engine and obtaining excellent drivability.

REFERENCE SIGNS LIST 1 control system
2 ECU (operation state-detecting means, target auxiliary intake air amount-calculating means, target intake air-calculating means, misfire determination means, control means, remaining EGR ratio-estimating means, determination means)
3 engine
4 intake passage
5 exhaust passage
6 throttle valve
10 supercharging device (supercharger)
10a compressor blade (compressor)
11 EGR device
11a EGR passage
12 intercooler
13 bypass passage
14 auxiliary intake air amount control valve
26 crank angle sensor (operation state-detecting means)
27 accelerator opening degree sensor (operation state-detecting means)
NE engine speed (operation state of the engine)
AP accelerator opening degree (operation state of the engine)
SAIRCMD target auxiliary intake air amount
GAIRCMD target intake air amount
EGRACT remaining EGR ratio

The invention claimed is:

1. A control system for an internal combustion engine that includes an EGR passage connected to an intake passage and an exhaust passage, and is provided with an EGR device for recirculating part of exhaust gases which are exhausted to the exhaust passage, as EGR gas, via the EGR passage to the intake passage, comprising:
  a throttle valve provided on a downstream side of a connecting portion of the intake passage to the EGR passage, for controlling an amount of intake air flowing through the intake passage;
  a bypass passage connected to an upstream side of the connecting portion of the intake passage to the EGR passage, and to a downstream side of the throttle valve in the intake passage;
  an auxiliary intake air amount control valve provided in the bypass passage, for controlling an auxiliary intake air amount which is an amount of fresh air supplied to a combustion chamber of the engine via the bypass passage;
  operation state-detecting means for detecting an operation state of the engine;
  target auxiliary intake air amount-calculating means for calculating a target auxiliary intake air amount which is necessary for avoiding misfiring of the engine, by supplying only the auxiliary intake air amount to the combustion chamber, according to the detected operation state of the engine;
  target intake air amount-calculating means for calculating a target intake air amount which is a target value of an amount of intake air supplied to the combustion chamber, according to the operation state of the engine;
  misfire determination means for determining whether or not the engine misfires; and
  control means for executing, when the engine is in the decelerating operation state and it is determined that the engine misfires, misfire avoidance control for controlling the auxiliary intake air amount control valve to be more opened such that the auxiliary intake air amount becomes the calculated target auxiliary intake air amount, and controlling the throttle valve to be more closed such that the amount of intake air supplied to the combustion chamber becomes the calculated target intake air amount.

2. The control system of the engine as claimed 1, wherein during execution of the misfire avoidance control, said control means executes controlling the throttle valve to be more closed, according to the target auxiliary intake air amount.

3. The control system of the engine as claimed in claim 1, wherein during execution of the misfire avoidance control, said control means controls the throttle valve such that the throttle valve is not brought to a fully-closed state.

4. The control system of the engine as claimed in claim 1, wherein in the intake passage, there are provided a compressor of a supercharger for supercharging intake air, and a intercooler for cooling intake air, from upstream in a mentioned order, and the intercooler is provided on the upstream side of the throttle valve in the intake passage, and
  wherein the EGR passage is connected to an upstream side of the compressor in the intake passage.

5. The control system as claimed in claim 1, further comprising:
  remaining EGR ratio-estimating means for estimating a remaining EGR ratio which is a ratio of an amount of EGR gas to an amount of remaining intake air remaining on the upstream side of the throttle valve in the intake passage, during execution of the misfire avoidance control; and determination means for determining, according to the estimated remaining EGR ratio, whether or not the engine misfires when only the remaining intake air is supplied to the combustion chamber, during execution of the misfire avoidance control, and wherein during execution of the misfire avoidance control, said control means continuously executes the misfire avoidance control when it is determined by said determination means that the engine misfires, and terminates the misfire avoidance control when it is determined by said determination means that the engine does not misfire.

6. The control system of the engine as claimed in claim 2, wherein during execution of the misfire avoidance control, said control means controls the throttle valve such that the throttle valve is not brought to a fully-closed state.

7. The control system of the engine as claimed in claim 2, wherein in the intake passage, there are provided a compressor of a supercharger for supercharging intake air, and a intercooler for cooling intake air, from upstream in a mentioned order, and the intercooler is provided on the upstream side of the throttle valve in the intake passage, and wherein the EGR passage is connected to an upstream side of the compressor in the intake passage.

8. The control system of the engine as claimed in claim 3, wherein in the intake passage, there are provided a compressor of a supercharger for supercharging intake air, and a intercooler for cooling intake air, from upstream in a mentioned order, and the intercooler is provided on the upstream side of the throttle valve in the intake passage, and wherein the EGR passage is connected to an upstream side of the compressor in the intake passage.

9. The control system of the engine as claimed in claim 6, wherein in the intake passage, there are provided a compressor of a supercharger for supercharging intake air, and a intercooler for cooling intake air, from upstream in a mentioned order, and the intercooler is provided on the upstream side of the throttle valve in the intake passage, and wherein the EGR passage is connected to an upstream side of the compressor in the intake passage.

10. The control system as claimed in claim 2, further comprising:

remaining EGR ratio-estimating means for estimating a remaining EGR ratio which is a ratio of an amount of EGR gas to an amount of remaining intake air remaining on the upstream side of the throttle valve in the intake passage, during execution of the misfire avoidance control; and determination means for determining, according to the estimated remaining EGR ratio, whether or not the engine misfires when only the remaining intake air is supplied to the combustion chamber, during execution of the misfire avoidance control, and wherein during execution of the misfire avoidance control, said control means continuously executes the misfire avoidance control when it is determined by said determination means that the engine misfires, and terminates the misfire avoidance control when it is determined by said determination means that the engine does not misfire.

11. The control system as claimed in claim 3, further comprising:

remaining EGR ratio-estimating means for estimating a remaining EGR ratio which is a ratio of an amount of EGR gas to an amount of remaining intake air remaining on the upstream side of the throttle valve in the intake passage, during execution of the misfire avoidance control; and determination means for determining, according to the estimated remaining EGR ratio, whether or not the engine misfires when only the remaining intake air is supplied to the combustion chamber, during execution of the misfire avoidance control, and wherein during execution of the misfire avoidance control, said control means continuously executes the misfire avoidance control when it is determined by said determination means that the engine misfires, and terminates the misfire avoidance control when it is determined by said determination means that the engine does not misfire.

12. The control system as claimed in claim 6, further comprising:

remaining EGR ratio-estimating means for estimating a remaining EGR ratio which is a ratio of an amount of EGR gas to an amount of remaining intake air remaining on the upstream side of the throttle valve in the intake passage, during execution of the misfire avoidance control; and determination means for determining, according to the estimated remaining EGR ratio, whether or not the engine misfires when only the remaining intake air is supplied to the combustion chamber, during execution of the misfire avoidance control, and wherein during execution of the misfire avoidance control, said control means continuously executes the misfire avoidance control when it is determined by said determination means that the engine misfires, and terminates the misfire avoidance control when it is determined by said determination means that the engine does not misfire.

13. The control system as claimed in claim 4, further comprising:

remaining EGR ratio-estimating means for estimating a remaining EGR ratio which is a ratio of an amount of EGR gas to an amount of remaining intake air remaining on the upstream side of the throttle valve in the intake passage, during execution of the misfire avoidance control; and determination means for determining, according to the estimated remaining EGR ratio, whether or not the engine misfires when only the remaining intake air is supplied to the combustion chamber, during execution of the misfire avoidance control, and wherein during execution of the misfire avoidance control, said control means continuously executes the misfire avoidance control when it is determined by said determination means that the engine misfires, and terminates the misfire avoidance control when it is determined by said determination means that the engine does not misfire.

14. The control system as claimed in claim 7, further comprising:

remaining EGR ratio-estimating means for estimating a remaining EGR ratio which is a ratio of an amount of EGR gas to an amount of remaining intake air remaining on the upstream side of the throttle valve in the intake passage, during execution of the misfire avoidance control; and determination means for determining, according to the estimated remaining EGR ratio, whether or not the engine misfires when only the remaining intake air is supplied to the combustion chamber, during execution of the misfire avoidance control, and wherein during execution of the misfire avoidance control, said control means continuously executes the misfire avoidance control when it is determined by said determination means that the engine misfires, and terminates the misfire avoidance control when it is determined by said determination means that the engine does not misfire.

15. The control system as claimed in claim 8, further comprising:

remaining EGR ratio-estimating means for estimating a remaining EGR ratio which is a ratio of an amount of EGR gas to an amount of remaining intake air remaining on the upstream side of the throttle valve in the intake passage, during execution of the misfire avoidance control; and determination means for determining, according to the estimated remaining EGR ratio, whether or not the engine misfires when only the remaining intake air is supplied to the combustion chamber, during execution of the misfire avoidance control, and wherein during execution of the misfire avoidance control, said control means continuously executes the misfire avoidance control when it is determined by said determination means that the engine misfires, and terminates the misfire avoidance control when it is determined by said determination means that the engine does not misfire.

16. The control system as claimed in claim 9 further comprising:

remaining EGR ratio-estimating means for estimating a remaining EGR ratio which is a ratio of an amount of EGR gas to an amount of remaining intake air remaining on the upstream side of the throttle valve in the intake passage, during execution of the misfire avoidance control; and determination means for determining, according to the estimated remaining EGR ratio, whether or not the engine misfires when only the remaining intake air is supplied to the combustion chamber, during execution of the misfire avoidance control, and wherein during execution of the misfire avoidance control, said control means continuously executes the misfire avoidance control when it is determined by said determination means that the engine misfires, and terminates the misfire avoidance control when it is determined by said determination means that the engine does not misfire.

* * * * *